(12) United States Patent
Okada et al.

(10) Patent No.: US 10,847,769 B2
(45) Date of Patent: Nov. 24, 2020

(54) VEHICULAR POWER SOURCE DEVICE EQUIPPED WITH SERVICE PLUG PROTECTION COVER

(71) Applicant: SANYO Electric Co., Ltd., Daito (JP)

(72) Inventors: Wataru Okada, Hyogo (JP); Kosho Abe, Hyogo (JP); Yusuke Fujii, Hyogo (JP); Yoshiaki Ueta, Osaka (JP)

(73) Assignee: SANYO Electric Co., Ltd., Daito (JP)

( * ) Notice: Subject to any disclaimer, the term of this patent is extended or adjusted under 35 U.S.C. 154(b) by 15 days.

(21) Appl. No.: 16/319,543

(22) PCT Filed: May 9, 2017

(86) PCT No.: PCT/JP2017/017451
§ 371 (c)(1),
(2) Date: Jan. 22, 2019

(87) PCT Pub. No.: WO2018/020770
PCT Pub. Date: Feb. 1, 2018

(65) Prior Publication Data
US 2019/0267588 A1    Aug. 29, 2019

(30) Foreign Application Priority Data
Jul. 28, 2016 (JP) ................................. 2016-149024

(51) Int. Cl.
*H01M 2/10* (2006.01)
*B60R 16/033* (2006.01)

(52) U.S. Cl.
CPC ......... *H01M 2/1072* (2013.01); *B60R 16/033* (2013.01); *H01M 2220/20* (2013.01)

(58) Field of Classification Search
CPC .. H01R 13/447; H01R 13/5213; H01R 13/53; H01M 2/1072; H01M 2220/20; B60R 16/033
(Continued)

(56) References Cited

U.S. PATENT DOCUMENTS 3,848,764 A * 11/1974 Salg ..................... H02G 3/123
                                                220/3.6
3,863,021 A *  1/1975 Schindler ............ H02G 3/085
                                                174/53
(Continued)

FOREIGN PATENT DOCUMENTS

JP    2005-50616 A    2/2005
JP    2009-83601 A    4/2009
(Continued)

OTHER PUBLICATIONS

International Search Report dated Aug. 8, 2017, issued in counterpart application No. PCT/JP2017/017451 (2 pages).

*Primary Examiner* — Gary F Paumen
(74) *Attorney, Agent, or Firm* — Westerman, Hattori, Daniels & Adrian, LLP (57) ABSTRACT

A vehicular power source device includes: a case incorporating a battery; a service plug coupled to the battery incorporated in the case; and a protection cover of the service plug. The protection cover includes: a covering portion of the service plug; a fixing board fixed to the case via a fastener; and an opening board disposed to be adjacent to the fixing board and providing a gap to the case. In addition, the fixing board includes: a fixing portion fixed onto the case via the fastener; a linking portion linking the fixing portion to the covering portion; and a breaking portion. The breaking portion is provided in the fixing portion or in a boundary portion between the fixing portion and the linking portion, and a breaking strength of the breaking portion is lower than that of the linking portion.

8 Claims, 6 Drawing Sheets

(58) Field of Classification Search
USPC .................................................. 439/475, 135
See application file for complete search history.

(56) References Cited

U.S. PATENT DOCUMENTS

| | | | | |
|---|---|---|---|---|
| 3,926,330 | A * | 12/1975 | Denning | H02G 3/085 |
| | | | | 220/3.9 |
| 5,191,171 | A * | 3/1993 | Bordwell | H02G 3/085 |
| | | | | 174/666 |
| 6,051,786 | A * | 4/2000 | Gretz | H02G 3/14 |
| | | | | 174/50 |
| 7,086,899 | B1 * | 8/2006 | Miyakawa | H01R 13/506 |
| | | | | 439/475 |
| 7,353,961 | B2 * | 4/2008 | Hull | H02G 3/085 |
| | | | | 174/666 |
| 7,438,497 | B2 * | 10/2008 | Yoshino | B60R 16/0215 |
| | | | | 403/408.1 |
| 8,308,502 | B2 * | 11/2012 | Lang | H02K 5/225 |
| | | | | 439/34 |
| 2008/0110661 | A1 * | 5/2008 | Dinh | H01R 13/5213 |
| | | | | 174/53 |
| 2010/0230127 | A1 * | 9/2010 | Rodenberg | H02G 3/086 |
| | | | | 174/50 |
| 2013/0175086 | A1 * | 7/2013 | Lupsa | H02G 3/085 |
| | | | | 174/666 |
| 2015/0367718 | A1 * | 12/2015 | Hayashi | B62D 25/20 |
| | | | | 180/68.5 |

FOREIGN PATENT DOCUMENTS

| | | |
|---|---|---|
| JP | 2012-126267 A | 7/2012 |
| JP | 2013-164993 A | 8/2013 |
| JP | 2015-182731 A | 10/2015 |
| WO | 2014/128869 A1 | 8/2014 |

\* cited by examiner

VEHICULAR POWER SOURCE DEVICE EQUIPPED WITH SERVICE PLUG PROTECTION COVER

TECHNICAL FIELD

The present invention relates to a vehicular power source device equipped with a protection cover of a service plug which is connected to a battery in series. Especially, the present invention relates to a vehicular power source device in which a protection cover can be opened quickly at emergency.

BACKGROUND ART

The power source device which supplies power to a driving motor of a vehicle, increases an output voltage by connecting a plurality of battery cells in series. As the power source device having a high output voltage, wires cables of high voltage inside the vehicle, and at emergence of car crash, a service plug is provided in order to prevent an electric shock which happens by contacting the high voltage cable or terminals connected thereto. The service plug is connected to the batteries in series, and is pulled out at emergency to cut off the output voltage of the power source device. When the service plug is displaced incorrectly in a usage state of the vehicle and the output of the power source device is cut off, the power source device cannot supply power to the driving motor to have harmful effects in driving of the vehicle. Therefore, a protection cover is disposed in order to prevent a displacement of the service plug.

It is necessary to expose the service plug by removing the protection cover when the service plug is pulled out and attached. Therefore, the structure where the protection cover can be easily removed has been developed. (refer to Patent Literature 1)

CITATION LIST

Patent Literature

Patent Literature 1: Unexamined Japanese Patent Publication No. 2013-164993

SUMMARY OF THE INVENTION

Figure 8:
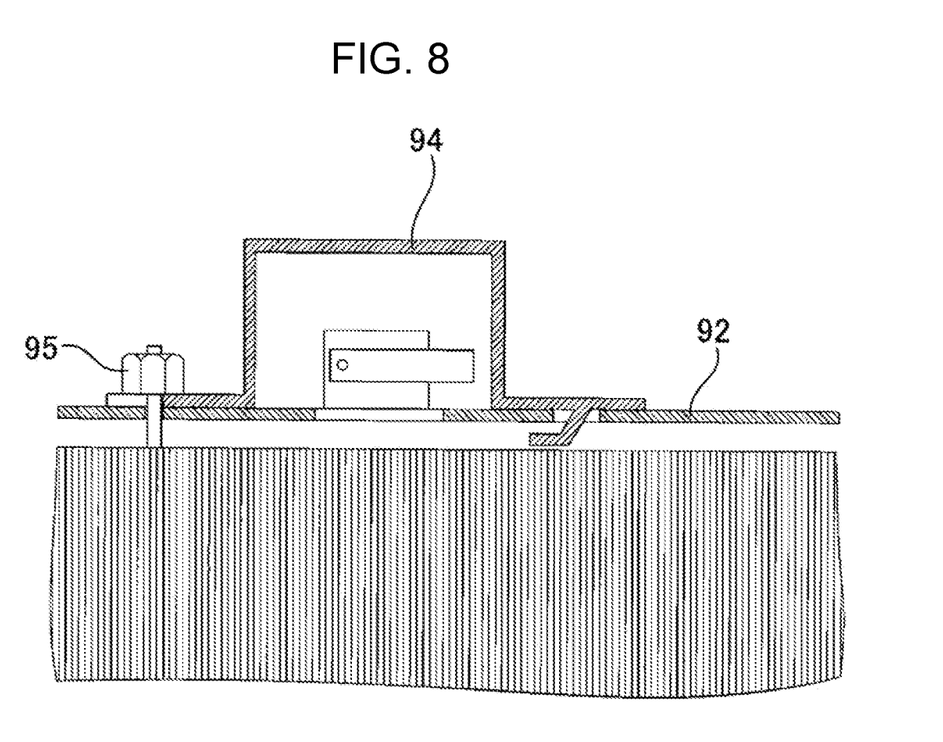
FIG. 8 is a sectional view of a conventional protection cover.

The protection cover described in patent Literature 1 is shown in a sectional view of FIG. 8. One end of this protection cover 94 is fixed by screw, and the other end thereof is coupled by engaging structure, to case 92 of the battery, so as to remove the protection cover 94 quickly. In the engaging structure of the figure, protection cover 94 is moved laterally, and the engaging state can be released. Nut 95 fixed to case 92 is unscrewed, and protection cover 94 is moved laterally to release the engaging structure, and protection cover 94 is removed from case 92. Since protection cover 94 can be removed from case 92 by unscrewing nut 95 at one end, protection cover 94 can be removed quickly from the case, compared with a structure where both ends of a protection cover are fixed by nuts. However, it is necessary to remove this protection cover by unscrewing the nut. Then, in a crashed vehicle by a collision or the like, it happens that a wrench or a spanner cannot be coupled to the nut and the protection cover cannot be removed.

The inventors developed a protection cover which can be removed by a bar carried by a rescue member, so as to remove the protection cover without coupling a wrench or a spanner to the nut. This protection cover includes fixing boards at both ends thereof, and a U-shaped groove is provided at one of the fixing boards, and a gap is provided to the case at the upper portion of the U-shaped groove, and the bar can be inserted into the gap. This protection cover can cover the service plug with the fixing boards of both ends fixed by the nuts to the case. Even in a case where the nuts cannot be unscrewed for some reason at emergency, a tip of the bar is inserted into the gap into which the rescue member inserts the bar, and the gap is expanded by using the bar forcibly. Then, the fixing board fixed by the nut is shifted and separated from the case, and the other fixing board is bent to expose the service plug. The U-shaped groove is provided where the screw screwed into the nut can be shifted, such that the fixing board fixed by the nut can be shifted. In this protection cover, the fixing board fixed by the nut is shifted, to expose the service plug, but there is the following defect. Since the fixing board is fixed to the case by tightly screwing the nut, it is impossible to quickly shift the fixing board to expose the service plug. In order to smoothly shift the fixing board, when a tightening torque of the nut is made small, the fixing board cannot be surely fixed to the case. Fixing the fixing board tightly and shifting the fixing board smoothly are conflicting conditions, and both of them cannot be achieved. Thus, there is the defect that the service plug cannot be exposed quickly at emergency while the protection cover is tightly stably fixed to the case.

Especially, in order that the protection cover surely protect the service plug in a normal usage state, the fixing board is surely fixed to the case by using a thick tough metal board. Therefore, the service plug cannot be exposed by quickly opening the protection cover with the bar being inserted into the gap.

The present invention has been accomplished to solve such a problem. An object of the present invention is to supply a vehicular power source device equipped with a protection cover of a service plug, where the protection cover is fixed stably onto a case and the protection cover is opened quickly so that the service plug can be handled in an emergency.

A vehicular power source device equipped with a service plug protection cover of one aspect of the present invention includes: a case incorporating a battery; a service plug coupled to the battery incorporated in the case; and a protection cover of the service plug. The protection cover includes: a covering portion of the service plug; a fixing board fixed to the case via a fastener; and a opening board disposed to be adjacent to the fixing board and providing a gap to the case where a bar is inserted. In addition, the fixing board includes: a fixing portion fixed onto the case via the fastener; a linking portion linking the fixing portion to the covering portion; and a breaking portion. The breaking portion is provided in the fixing portion or in a boundary portion between the fixing portion and the linking portion, and a breaking strength of the breaking portion is lower than that of the linking portion.

In the above-mentioned vehicular power source device, the protection cover is fixed stably onto the case and the protection cover is opened quickly so that the service plug can be handled or operated in an emergency. That is the reason in the above-mentioned power source device as follows. The breaking portion is provided in the fixing portion where the protection cover is fixed by nuts, or in a boundary portion between the fixing portion and the linking portion, and a breaking strength of the breaking portion is lower than that of the linking portion. Then, the protection cover is opened by breaking this breaking portion at emergency, and the service plug is exposed. When the bar is inserted into the gap for inserting the bar, the breaking portion provided at the fixing board is easily broken, and then the fixing board is separated from the case. By opening the protection cover whose the fixing board is separated from the case, the service plug can be handled or operated.

In the above-mentioned protection cover, it is not necessary that a wrench is precisely coupled to the nut and is rotated conventionally. Further, it is not necessary that the fixing board is shifted by the bar. Since the service plug can be exposed by breaking the breaking portion provided at the fixing board, even in a case where the nut cannot be unscrewed or rotated in car crash, the protection cover is simply, easily, and quickly opened, and the service plug can be handled or operated.

According to the vehicular power source device of the present invention, the fastener is any one of a screw and a nut.

In the above-mentioned vehicular power source device, the protection cover is opened by unscrewing the screw or the nut at maintenance of maintenance inspection, and the protection cover can be opened quickly by the bar at emergency.

According to the vehicular power source device of the present invention, the protection cover includes the fixing boards at both end portions of the protection cover, and the breaking portion is provided at one of the fixing boards.

According to the vehicular power source device of the present invention, the protection cover includes the fixing boards at both end portions of the protection cover, the breaking portion is provided at the one of the fixing boards, and a coupling width W1 between the other of the fixing boards and the covering portion is smaller than a transverse width W2 of the covering portion.

In the above-mentioned power source device, the fixing board at the fixing side is disposed at the opposite side of the fixing board of the broken side having the breaking portion, and the coupling width W1 of the fixing board at the fixing side is made smaller. Therefore, in a state where the breaking portion is broken, the fixing board at the fixing side is easily bent, and the protection cover is quickly opened, and the service plug can be handled or operated.

According to the vehicular power source device of the present invention, the breaking portion having a small thickness is provided in the boundary portion between the fixing portion and the linking portion, by half-punching the fixing board.

In the above-mentioned vehicular power source device, the fixing board having the breaking portion is firmly fixed to the case, and the service plug can be safely protected by the protection cover, and further the protection cover is quickly opened at emergency, and then the service plug can be handled or operated.

According to the vehicular power source device of the present invention, the fixing portion is thinner than the linking portion, and the thinner fixing portion is used as the breaking portion.

In the above-mentioned vehicular power source device, the fixing portion can be simply made the thin breaking portion by pressing work.

According to the vehicular power source device of the present invention, a slit is provided between the fixing portion and the linking portion, and the breaking portion is provided between the fixing portion and the linking portion.

In the above-mentioned vehicular power source device, while the fixing portion is firmly fixed to the case, further the protection cover is simply opened, and then the service plug can be handled or operated, by breaking the breaking portion.

According to the vehicular power source device of the present invention, the opening board is disposed to be adjacent to the upper portion of the fixing board, and the opening board and the fixing board are vertically disposed at one of side portions of the covering portion.

In the above-mentioned vehicular power source device, the breaking portion of the fixing board is efficiently broken by inserting the bar into the gap, to open the protection cover. That is the reason in the structure as follows. Since the opening board where the bar is inserted, is provided adjacent to the fixing board, the expanding strength by the bar is efficiently conveyed or transmitted to the breaking portion, and the breaking portion is broken.

DESCRIPTION OF EMBODIMENTS

Exemplary embodiments and examples of the present invention have been described with reference to the drawings. However, the exemplary embodiment described below shows a vehicular power source device equipped with a protection cover of a service plug for embodying the technical ideas of the present invention. The vehicular power source device of the present invention is not limited to the following. Further, in the present description, components shown in the scope of claims are not limited to the components of the exemplary embodiment.

Figure 1:
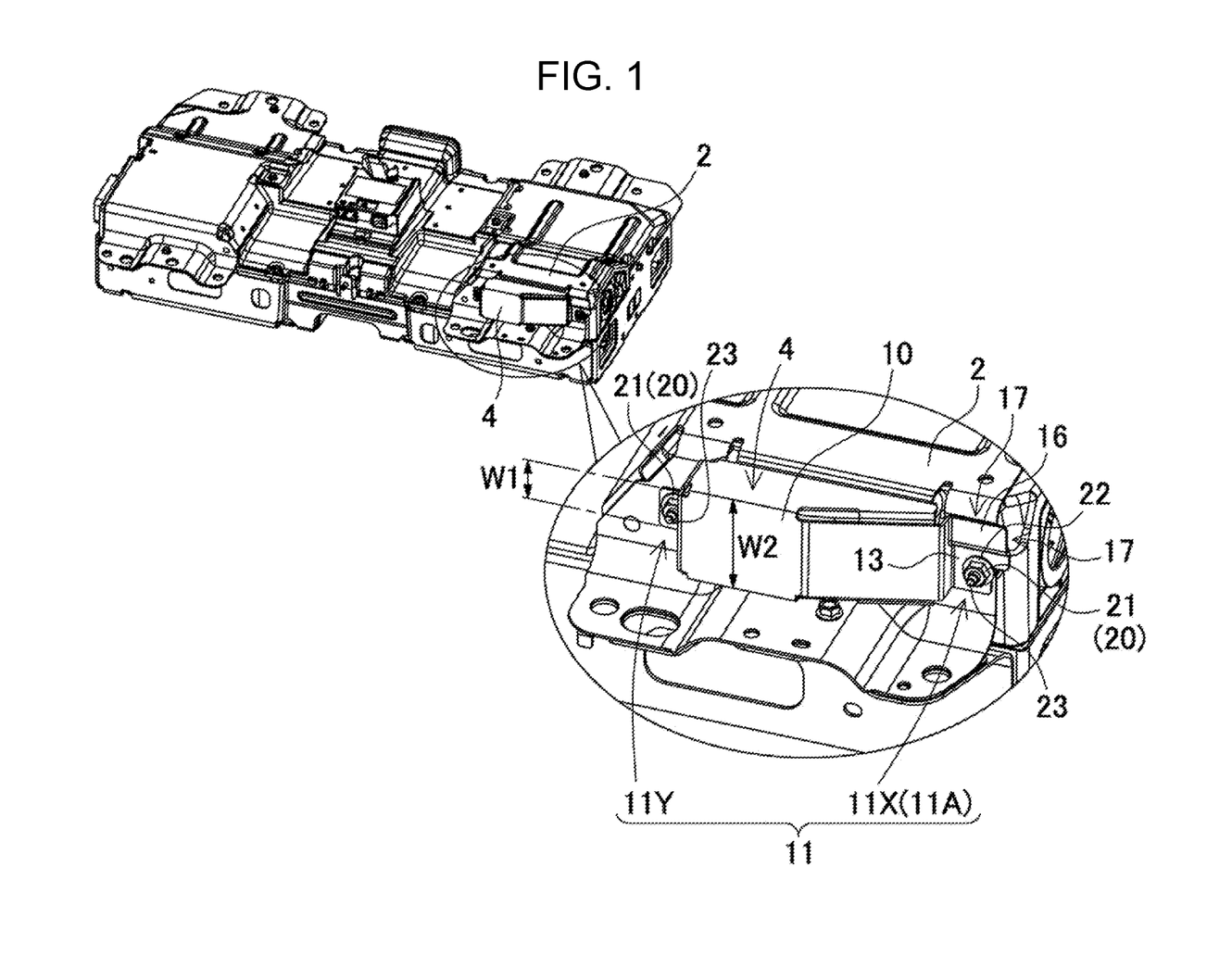
FIG. 1 is a perspective view of a vehicular power source device including a partial enlarged view, according to one exemplary embodiment of the present invention.
Figure 2:
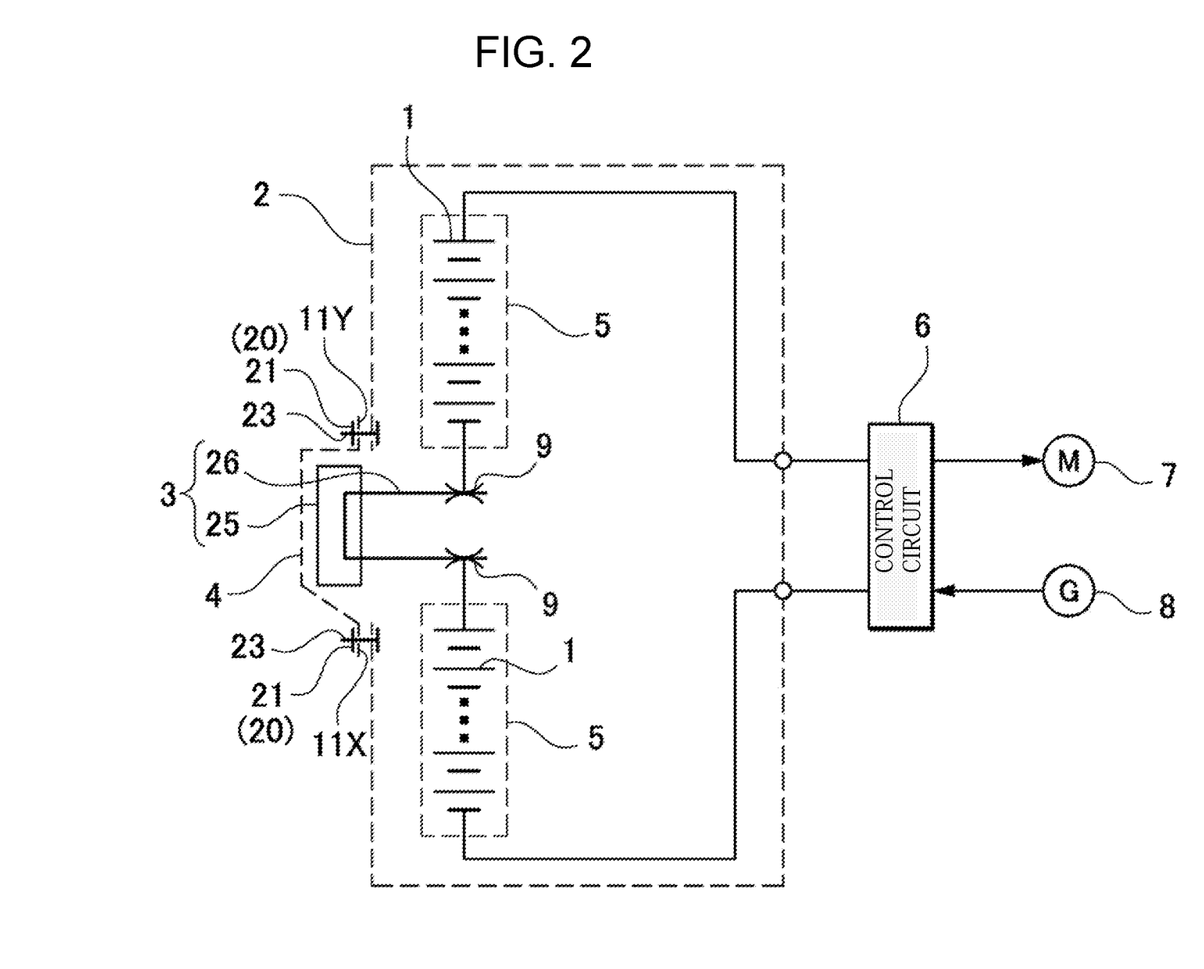
FIG. 2 is a block diagram of the vehicular power source device shown in FIG. 1.

A vehicular power source device shown in a partial enlarged perspective view of FIG. 1 and a block diagram of FIG. 2, includes: case 2 incorporating a plurality of batteries 1; service plug 3 coupled to batteries 1 incorporated in case 2; and protection cover 4 of service plug 3. Service plug 3 is provided so as to cut off a high voltage circuit of the power source device, and the power source device can be separated from a load of the vehicle side by pulling out service plug 3. In the example of the present invention, as shown in the block diagram of FIG. 2, service plug 3 is coupled between two of battery blocks 5, and service plug 3 connects battery blocks 5 in series. The power source device is used in a state where service plug 3 is inserted. In this state, the power source device is connected to driving motor 7 and generator 8 through control circuit 6 connected at the output side. The power source device supplies power to driving motor 7 through control circuit 6, and charges batteries 1 by power inputted from generator 8. Service plug 3 is pulled out at maintenance of maintenance inspection or at emergency of car accident, and this prevents a trouble of an electric shock by cutting off the output voltage.

Service plug 3 is held at an inserted position in a normal usage state. That is a reason why the output is cut off and driving motor 7 cannot be driven when service plug 3 is pulled out. The vehicular power source device is disposed inside the vehicle, or at a trunk room or a chassis. Service plug 3 is disposed in a position where service plug 3 can be handled, in a state where service plug 3 is installed in the vehicle. Therefore, it happens that service plug 3 is displaced by being incorrectly touched by a driver or a serviceman. In order to prevent this harmful effect, in the normal usage state, service plug 3 is covered with protection cover 4, and is held in a state where service plug 3 cannot be handled or operated. When service plug 3 is handled at maintenance or at emergency, it is necessary to open or remove protection cover 4.

In the power source device of FIG. 1, service plug 3 and protection cover 4 are proved at a side surface of case 2. For example, this power source device is fixed between a seat and the chassis. In this power source device, protection cover 4 is opened or removed, and service plug 3 is handled or operated.

Service plug 3 connects battery blocks 5 in series by inserting service plug 3 into connecting terminal 9 which is fixed at case 2 in an insulating state. Then, service plug 3 is pulled out from connecting terminal 9 to cut off the output. Service plug 3 of FIG. 2, includes insulating knob 25 (finger grip), and metal board 26 which is fixed to insulating knob 25. Insulating knob 25 is gripped, and metal board 26 is inserted into connecting terminal 9, and then service plug 3 is in a connecting state. Then, metal board 26 is pulled out from connecting terminal 9 to cut off the output.

Protection cover 4 is formed by pressing a metal plate. In order to realize adequate strength, protection cover 4 is formed by pressing, for example, an iron board having a thickness of 1.5 mm. Here, the protection cover can be made of another metal board having adequate strength, or a plastic of a reinforced plastic or the like.

Protection cover 4 of FIG. 1 includes fixing boards 11 at both ends of covering portion 10. Fixing boards 11 are fixed to case 2 made of metal, by fasteners 20. When service plug 3 is handled or operated, fixing board 11 of the right side is broken, and fixing board 11 of the left side is bent, and service plug 3 is exposed. Fixing board 11 at the broken side, is broken at emergency, and is separated from case 2. Fixing board 11Y at the fixing side, is bent at the boundary to covering portion 10, and protection cover 4 is opened, and then service plug 3 is exposed, in a state where fixing board 11X at the broken side is broken. As mentioned above, at emergency, one fixing board 11 is broken, and the other fixing board 11 is bent, and then protection cover 4 of the figures is opened in a state where service plug 3 is handled or operated. Further, in the power source device of the present invention, the following structure can be also used. All fixing boards disposed at the protection cover are broken, and the service plug is exposed in a state where the service plug is handled or operated.

Figure 3:
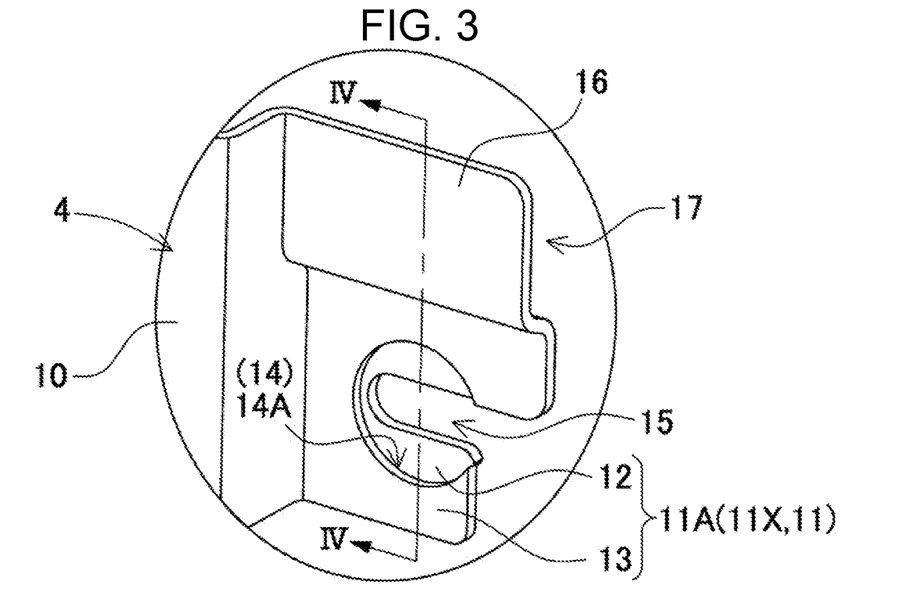
FIG. 3 is an enlarged perspective view illustrating a fixing board of a protection cover shown in FIG. 1.

Fixing board 11X at the broken side shown in FIGS. 1 and 3, includes: fixing portion 12 fixed to case 2 via nut 21 of fastener 20; linking portion 13 linking fixing portion 12 to covering portion 10. In protection cover 4, in a state where fixing portion 12 is fixed to case via nut 21 of fastener 20, fixing board 11 includes one part thereof as breaking portion 14 which is easily broken, and service plug 3 is exposed by breaking this breaking portion 14 at emergency. Fixing board 11A shown in FIGS. 1, 3, and 4, includes fixing portion 12 disk-shaped, and breaking portion 14 ring-shaped is provided by half-punching, making the peripheral edge of the disk thin. Disk-shaped fixing portion has a diameter larger than the outer diameter of washer 22 tighten by nut 21, and washer 22 is disposed at fixing portion 12, and fixing portion 12 is fixed to case 2, by nut 21 tightening fixing portion 12 via washer 22. Further, fixing portion 12 is provided with U-shaped groove 15 where screw 23 of fastener 20 is inserted, extending from the center toward the periphery.

Figure 4:
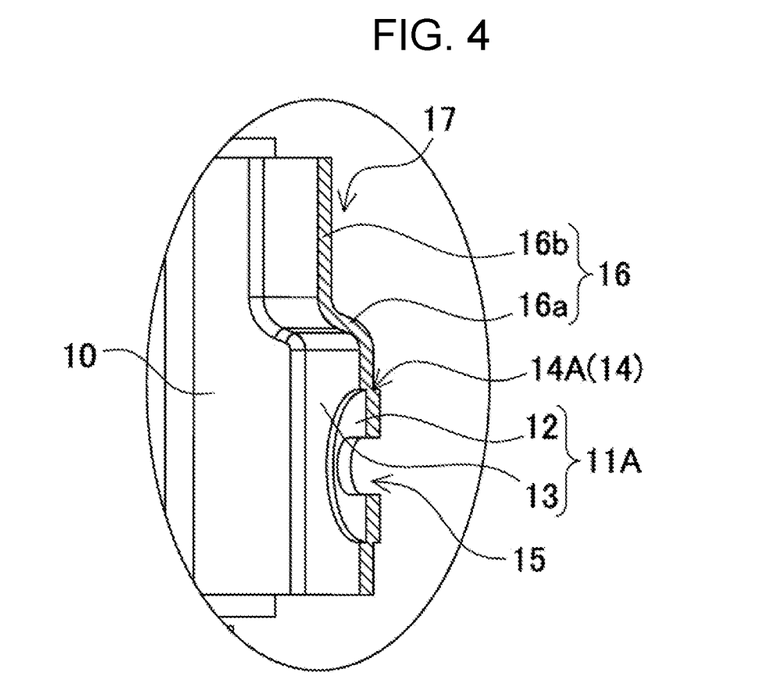
FIG. 4 is a sectional perspective view along a line IV-IV in FIG. 3.

Half-punching projects fixing portion 12 from linking portion 13, and therefore thin breaking portion 14A having a small thickness is provided at the boundary between fixing portion 12 and linking portion 13. Ring-shaped breaking portion 14A which is made thin by half-punching, has a thickness of 20% or more to 80% or less of the thickness of linking portion 13. In fixing board 11A of this structure, nut 21 can be tightened with adequate tightening torque, and fixing portion 12 can be firmly fixed to case 2. In protection cover 4 of the above-mentioned configuration, protection cover 4 can be removed by unscrewing nut 21. However, even in a case where nut 21 cannot be unscrewed by a wrench or a spanner for some reason, at emergency, service plug 3 can be exposed by breaking quickly breaking portion 14A with a bar.

Figure 5:
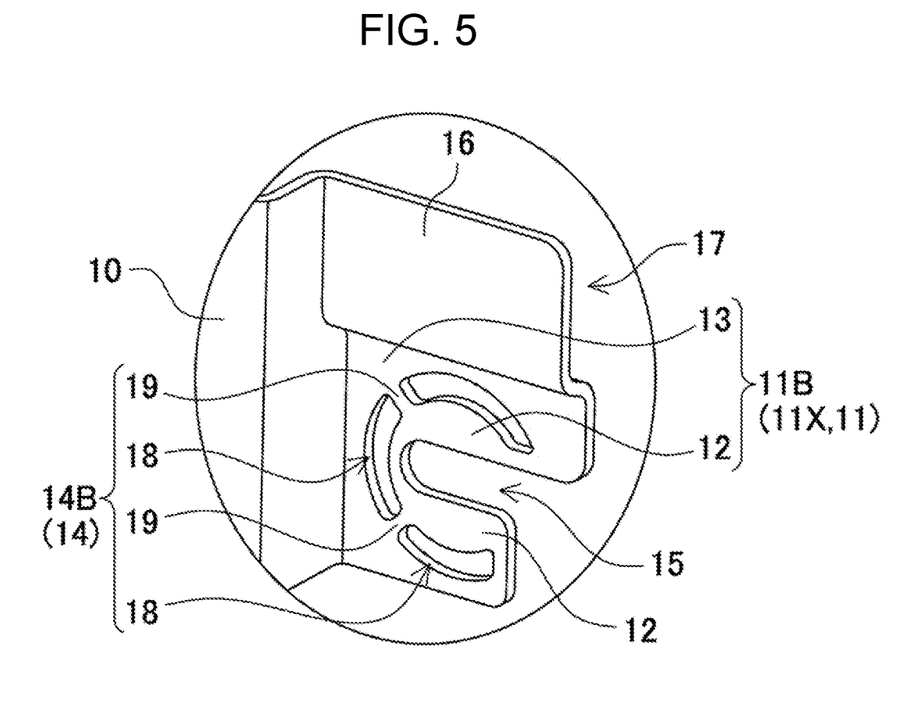
FIG. 5 is an enlarged perspective view illustrating another example of a fixing board.

Fixing board 11B of FIG. 5, is provided with a plurality of slits along a boundary between fixing portion 12 and linking portion 13, and fine bridges 19 are disposed between adjacent slits 18, and therefore breaking portion 14B is provided between fixing portion 12 and linking portion 13. In this fixing board 18B, the breaking strength of breaking portion 14B can be adjusted by a ratio of lengths of slits 18 to bridges 19, namely, the ratio of bridges 19/slits 18. The ratio of the lengths of bridges 19/slits 18 is set at, for example, ½0 or more to ⅓ or less, and breaking portion 14B can be broken quickly at emergency. Also in fixing board 11B, nut 21 can be tightened with adequate tightening torque, and fixing portion 12 can be firmly fixed to case 2. Further, at emergency, service plug 3 can be exposed by breaking quickly breaking portion 14B with a bar.

Figure 6:
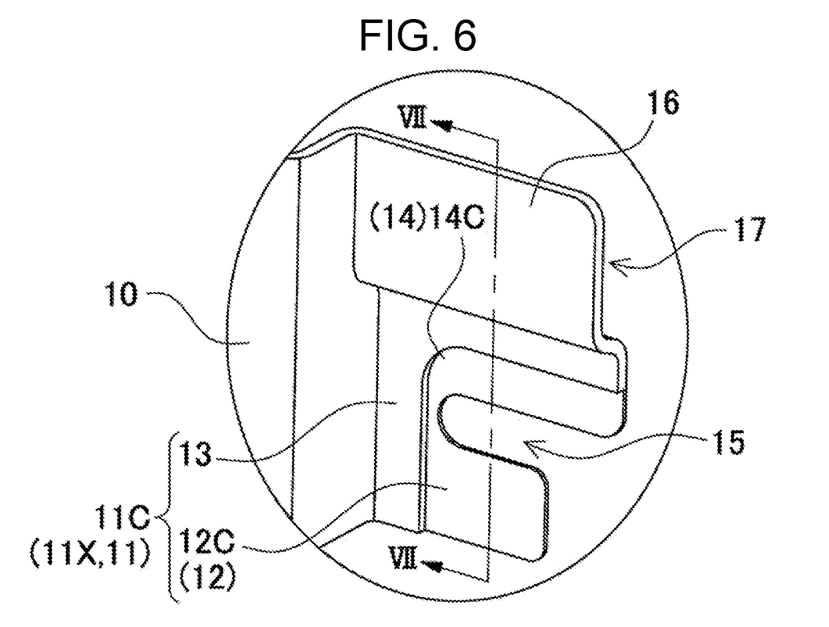
FIG. 6 is an enlarged perspective view illustrating further another example of a fixing board.
Figure 7:
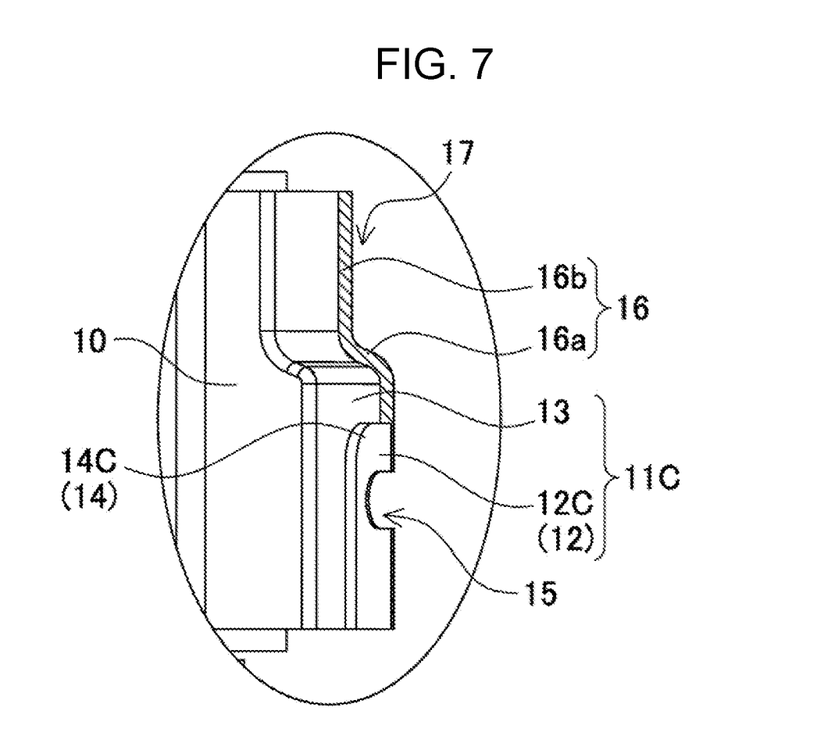
FIG. 7 is a sectional perspective view along a line VII-VII in FIG. 6.

In fixing board 110 of FIGS. 6 and 7, fixing portion 12C is thinner than linking portion 13, and thinner fixing portion 12C is used as breaking portion 14C. In fixing board 110, the breaking strength of breaking portion 14C can be controlled by adjusting the thickness of fixing portion 12C. Therefore, the thickness of fixing portion 12C is set at, for example, ⅕ or more to ½ or less of the thickness of linking portion 13, and service plug 3 can be exposed by breaking one part of fixing portion 12C at emergency.

In order to break breaking portion 14 disposed at fixing board 11 by the bar at emergency, protection cover 4 has gap 17 to case 2, and the bar can be inserted into gap 17. Protection cover 4 of FIG. 1 has gap 17 between opening board 16 and case 2, and the bar can be inserted into gap 17. In protection cover 4 of FIG. 1, opening board 16 is disposed to be adjacent to the upper portion of fixing board 11, and opening board 16 and fixing board 11 are vertically disposed at one of side portions (right end in the figures) of covering portion 10. Opening board 16 is linked to the upper side of fixing board 11X at the broken side, and gap 17 for inserting the bar, is disposed at one end of covering portion 10. In opening board 16 of the figures, gap 17 for inserting the bar has an opening upward and sideward.

As shown in FIG. 4, opening board 16 has a L-shaped cross-section, and in opening board 16, first side 16a (lower edge in the figures) is coupled to fixing board 11, and second side 16b of a L-shape is coupled to covering portion 10. The bending strength of this opening board 16 can be enhanced by coupling the two sides thereof to fixing board 11 and covering portion 10. Therefore, when the gap is expanded by inserting the bar into gap 17 for inserting the bar, a deformation can be prevented, and breaking portion 14 can be efficiently broken. Since opening board 16 is disposed to be adjacent to fixing board 11, the expanding strength by the bar is efficiently conveyed or transmitted to breaking portion 14, and breaking portion 14 can be efficiently broken.

In protection cover 4 of FIG. 1, fixing boards 11 are provided at both ends of covering portion 10, and breaking portion 14 is provided at the one of fixing boards 11, and breaking portion 14 is not provided at the other of the fixing boards 11. Fixing board 11Y at the fixing side having no breaking portion 14, is bent and exposes service plug 3. In protection cover 4 of FIG. 1, a coupling width W1 between fixing board 11Y at the fixing side and covering portion 10 is smaller than a transverse width W2 of covering portion 10. In protection cover 4, after breaking fixing board 11X at the broken side by the bar, fixing board 11Y at the fixing side, can be smoothly bent and can expose service plug 3. In protection cover 4 of the figures, the coupling width W1 between fixing board 11Y at the fixing side and covering portion 10 is about ½ of the transverse width W2 of covering portion 10, to be easily bent. However, the coupling width W1 between fixing board 11Y at the fixing side and covering portion 10 can be ⅓ or more to ⅔ or less of the transverse width W2 of covering portion 10, to be easily bent.

Protection cover 4 of FIG. 1 is fixed to case 2 through fixing boards 11 provided at both ends, by tightening nuts 21 of fasteners 20. Screw 23 into which nut 21 is screwed, is fixed by welding or the like, so as not to rotate against case 2. Fasteners 20 can firmly fix protection cover 4 to case 2, via fixing boards 11 by screwing nuts 21. Here, in the power source device of the present invention, the fastener is not limited to the nut. For example, a tapping screw or a screw (not shown in figures) is used as the fastener, and this is screwed into the case, to fix the fixing board to case. Further, when the protection cover is not removed at maintenance, the protection cover can be fixed to the case by using a rivet as the fastener.

The above-mentioned power source device is installed in the vehicle, and service plug 3 is covered with protection cover 4 in a normal usage state. Service plug 3 of this state can prevent the harmful effect that the service plug is displaced by being touched by an object or something. In the power source device where nut 21 is used as fastener 20, at maintenance of maintenance inspection, protection cover 4 is removed from case 2 by unscrewing nuts 21, and service plug 3 is handled or operated. At emergency of car crash, by inserting the bar into gap 17 for inserting the bar, breaking portion 14 provided at fixing board 11X of the broken side is broken, and further fixing board 11Y of the fixing side, is bent, and service plug 3 can be exposed to be handled or operate.

INDUSTRIAL APPLICABILITY

The power source device of the present invention, can be used as the vehicular power source device where the protection cover can be removed quickly at emergency, effectively preventing a trouble of an electric shock.

The invention claimed is:

1. A vehicular power source device equipped with a service plug protection cover, comprising:
    a case incorporating a battery;
    a service plug coupled to the battery incorporated in the case; and
    a protection cover of the service plug,
    wherein the protection cover includes: a covering portion of the service plug; at least one fixing board fixed to the case via a fastener; and an opening board disposed to be adjacent to the fixing board and providing a gap to the case,
    the fixing board includes: a fixing portion fixed to the case via the fastener; a linking portion linking the fixing portion to the covering portion; and a breaking portion, and
    the breaking portion is provided in the fixing portion or in a boundary portion between the fixing portion and the linking portion, and a breaking strength of the breaking portion is lower than that of the linking portion.

2. The vehicular power source device equipped with the service plug protection cover according to claim 1,
    wherein in the protection cover of the service plug, the fastener is any one of a screw and a nut.

3. The vehicular power source device equipped with the service plug protection cover according to claim 1,
    wherein the at least one fixing board is a plurality of fixing boards, the protection cover includes the plurality of fixing boards at both end portions of the protection cover, and the breaking portion is provided at one of the fixing boards.

4. The vehicular power source device equipped with the service plug protection cover according to claim 3,
    wherein a coupling width W1 between one of the fixing boards and the covering portion is smaller than a transverse width W2 of the covering portion.

5. The vehicular power source device equipped with the service plug protection cover according to claim 1,
    wherein the breaking portion having a small thickness is provided in the boundary portion between the fixing portion and the linking portion, by half-punching the fixing board.

6. The vehicular power source device equipped with the service plug protection cover according to claim 1,
    wherein the fixing portion is thinner than the linking portion, and the thinner fixing portion is used as the breaking portion.

7. The vehicular power source device equipped with the service plug protection cover according to claim 1,
    wherein a slit is provided between the fixing portion and the linking portion, and the breaking portion is provided between the fixing portion and the linking portion.

8. The vehicular power source device equipped with the service plug protection cover according to claim 1,
    wherein the opening board is disposed to be adjacent to the upper portion of the fixing board, and
    the opening board and the fixing board are vertically disposed at one of side portions of the covering portion.

* * * * *